United States Patent
Reese et al.

(10) Patent No.: US 10,838,660 B2
(45) Date of Patent: Nov. 17, 2020

(54) IDENTIFYING AND PROCESSING PREDEFINED DISPERSED STORAGE NETWORK WORKFLOWS

(71) Applicant: International Business Machines Corporation, Armonk, NY (US)

(72) Inventors: David E. Reese, Chicago, IL (US); Ethan S. Wozniak, Park Ridge, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 16/390,731

(22) Filed: Apr. 22, 2019

(65) Prior Publication Data

US 2020/0333979 A1 Oct. 22, 2020

(51) Int. Cl.
*G06F 3/06* (2006.01)
*G06F 11/10* (2006.01)

(52) U.S. Cl.
CPC ............ *G06F 3/0659* (2013.01); *G06F 3/067* (2013.01); *G06F 3/0619* (2013.01);
(Continued)

(58) Field of Classification Search
CPC ...... G06F 3/0659; G06F 3/0619; G06F 3/067; G06F 11/1076; G06F 3/0683; G06F 3/0689
(Continued)

(56) References Cited

U.S. PATENT DOCUMENTS 8,726,127 B2 * 5/2014 Grube ............... G06F 15/17331
714/763
8,776,186 B2 * 7/2014 Resch ................. G06F 11/1076
726/4
(Continued)

FOREIGN PATENT DOCUMENTS

WO 2013158707 A1 10/2013

OTHER PUBLICATIONS

National Institute of Standards and Technology; The NIST Definition of Cloud Computing; Special Publication 800-145; Dec. 13, 2016; pp. M-7 to M-13.
(Continued)

*Primary Examiner* — John J Tabone, Jr.
(74) *Attorney, Agent, or Firm* — James Nock; Andrew D. Wright; Roberts, Calderon, Safran & Cole, P.C.

(57) ABSTRACT

A method includes receiving, by a computing entity of a dispersed storage network (DSN), a request from a requesting device of the DSN to perform an encoded data slice operation. The request includes an indication that the encoded data slice operation is a stage in a predefined DSN workflow. The method further includes sending, by the computing entity, a response to the requesting device that includes a DSN workflow tag, wherein the DSN workflow tag includes an identifier of the stage in the predefined DSN workflow. The method further includes enabling a performance optimization mode. The performance optimization mode includes one or more performance optimization procedures for one or more of: the stage and one or more future stages of the predefined DSN workflow. The method further includes executing the encoded data slice operation in accordance with the performance optimization mode.

20 Claims, 11 Drawing Sheets

(52) U.S. Cl.
CPC ........ *G06F 11/1076* (2013.01); *G06F 3/0683* (2013.01); *G06F 3/0689* (2013.01)

(58) Field of Classification Search
USPC .................. 714/764, 769, 770, 773, 6.22
See application file for complete search history.

(56) References Cited

U.S. PATENT DOCUMENTS

| | | | |
|---|---|---|---|
| 8,782,492 B2* | 7/2014 | Resch | H04L 63/0823 714/764 |
| 9,032,081 B1 | 5/2015 | North et al. | |
| 9,043,574 B2 | 5/2015 | Motwani et al. | |
| 9,104,541 B2* | 8/2015 | Resch | H04L 9/0869 |
| 9,262,247 B2* | 2/2016 | Resch | H04L 63/0823 |
| 9,442,954 B2 | 9/2016 | Guha et al. | |
| 9,785,351 B2* | 10/2017 | Resch | G06F 3/067 |
| 9,785,491 B2* | 10/2017 | Cilfone | H04L 9/085 |
| 9,952,930 B2* | 4/2018 | Abhijeet | G06F 3/067 |
| 10,013,238 B2 | 7/2018 | Vandikas et al. | |
| 10,169,153 B2* | 1/2019 | Abhijeet | H03M 13/3761 |
| 10,230,692 B2* | 3/2019 | Quigley | H04L 67/1097 |
| 10,289,505 B2* | 5/2019 | Gladwin | H04L 65/604 |
| 10,325,110 B2* | 6/2019 | Leggette | G06F 21/31 |
| 10,379,744 B2* | 8/2019 | Iljazi | G06F 3/067 |
| 2004/0243699 A1 | 12/2004 | Koclanes | |
| 2011/0125771 A1* | 5/2011 | Gladwin | G06F 3/067 707/758 |
| 2011/0161680 A1* | 6/2011 | Grube | G06F 21/64 713/193 |
| 2011/0185141 A1* | 7/2011 | Dhuse | G06F 3/0647 711/165 |
| 2011/0225209 A1* | 9/2011 | Volvovski | G06F 16/122 707/803 |
| 2011/0314346 A1* | 12/2011 | Vas | G06F 11/1092 714/49 |
| 2012/0290830 A1* | 11/2012 | Resch | H04L 9/0841 713/150 |
| 2013/0046973 A1* | 2/2013 | Resch | H04L 9/0877 713/156 |
| 2013/0086377 A1* | 4/2013 | Cilfone | H04L 9/321 713/156 |
| 2013/0086447 A1* | 4/2013 | Resch | G06F 11/00 714/763 |
| 2013/0086642 A1* | 4/2013 | Resch | G06F 11/00 726/4 |
| 2014/0298085 A1* | 10/2014 | Baptist | G06F 11/0793 714/6.2 |
| 2014/0325208 A1* | 10/2014 | Resch | H04L 9/3263 713/156 |
| 2014/0325309 A1* | 10/2014 | Resch | H04L 9/3263 714/763 |
| 2014/0331086 A1* | 11/2014 | Resch | G06F 11/1458 714/15 |
| 2014/0344227 A1* | 11/2014 | Grube | H04L 67/1097 707/691 |
| 2014/0344617 A1* | 11/2014 | Resch | G06F 3/067 714/6.31 |
| 2015/0286833 A1* | 10/2015 | Resch | H04L 63/0823 726/29 |
| 2016/0313874 A1 | 10/2016 | Mikheev | |
| 2016/0350171 A1* | 12/2016 | Resch | G06F 3/0619 |
| 2017/0123910 A1* | 5/2017 | Abhijeet | G06F 3/0665 |
| 2017/0329792 A1 | 11/2017 | Banerjee et al. | |
| 2018/0007060 A1* | 1/2018 | Leblang | H04L 63/0853 |
| 2018/0024883 A1* | 1/2018 | Iljazi | G06F 11/1076 714/154 |
| 2018/0081750 A1* | 3/2018 | Leggette | G06F 3/067 |
| 2018/0267855 A1* | 9/2018 | Gray | G06F 3/0619 |
| 2019/0005261 A1* | 1/2019 | Volvovski | G06F 16/23 |

OTHER PUBLICATIONS

Pandey; Scheduling and Management of Data Intensive Application Workflows in Grid and Cloud Computing Environments; 2010; 203 pgs [downloaded from http://www.cloudbus.org/students/SurajPhDThesis2010.pdf].

* cited by examiner distributed, or dispersed, storage network (DSN) 10

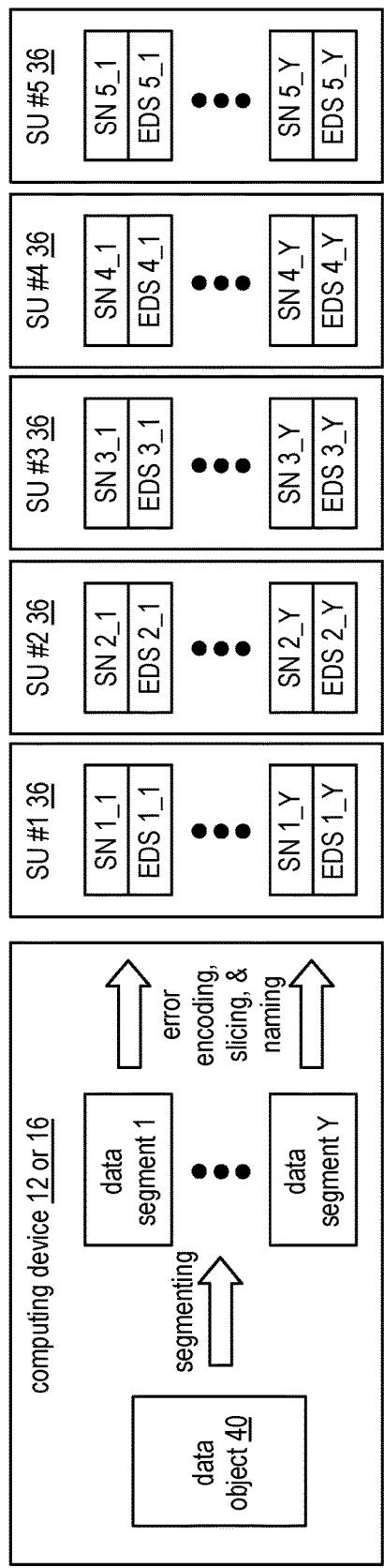
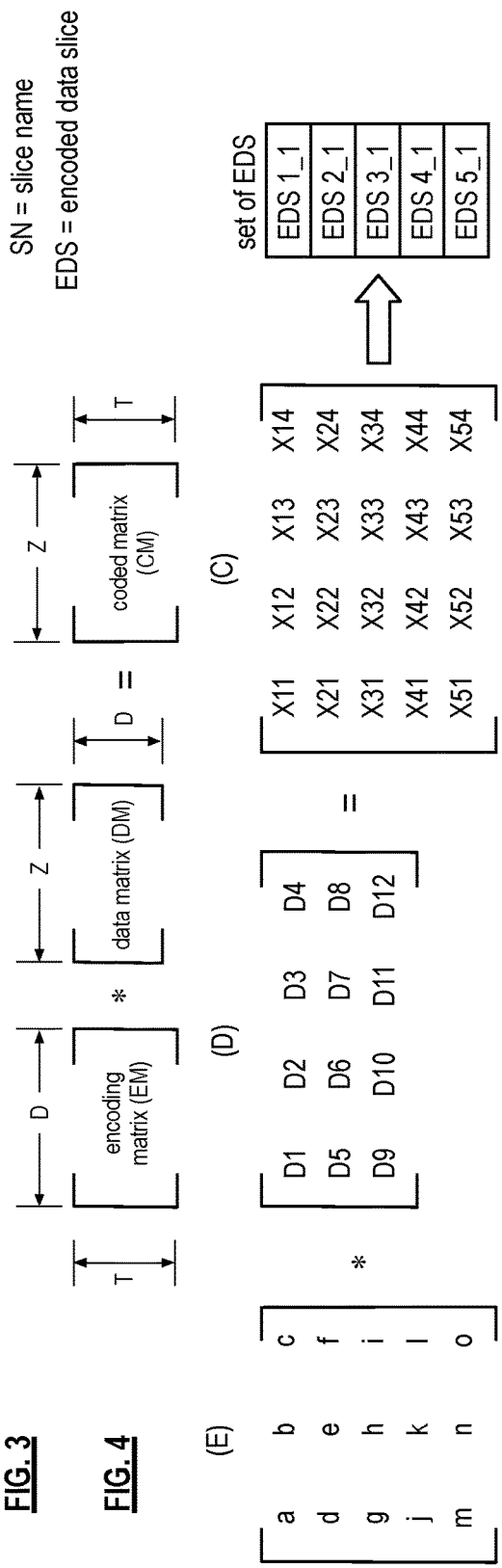
FIG. 3
FIG. 4
FIG. 5
FIG. 6

IDENTIFYING AND PROCESSING PREDEFINED DISPERSED STORAGE NETWORK WORKFLOWS

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
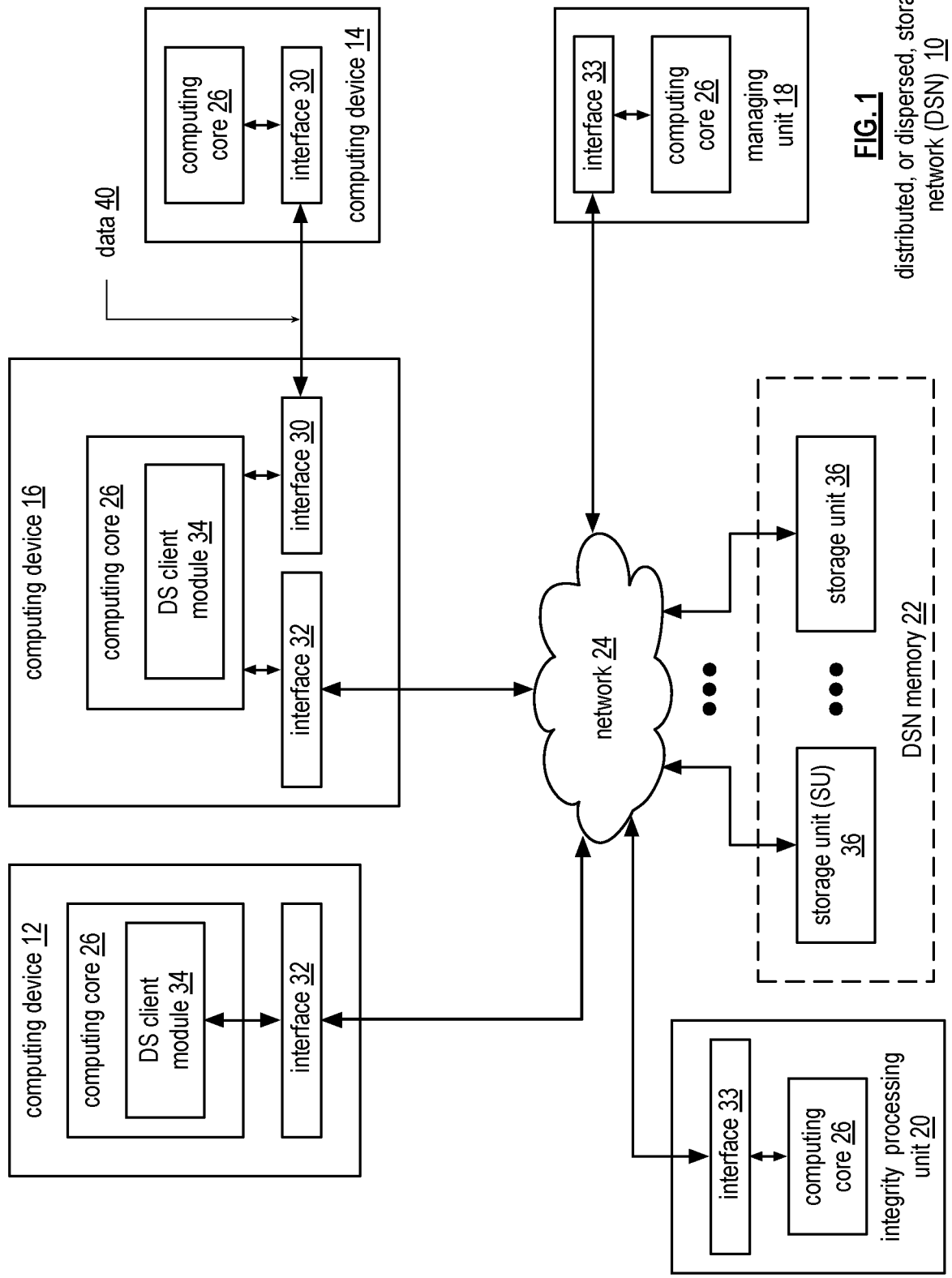
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
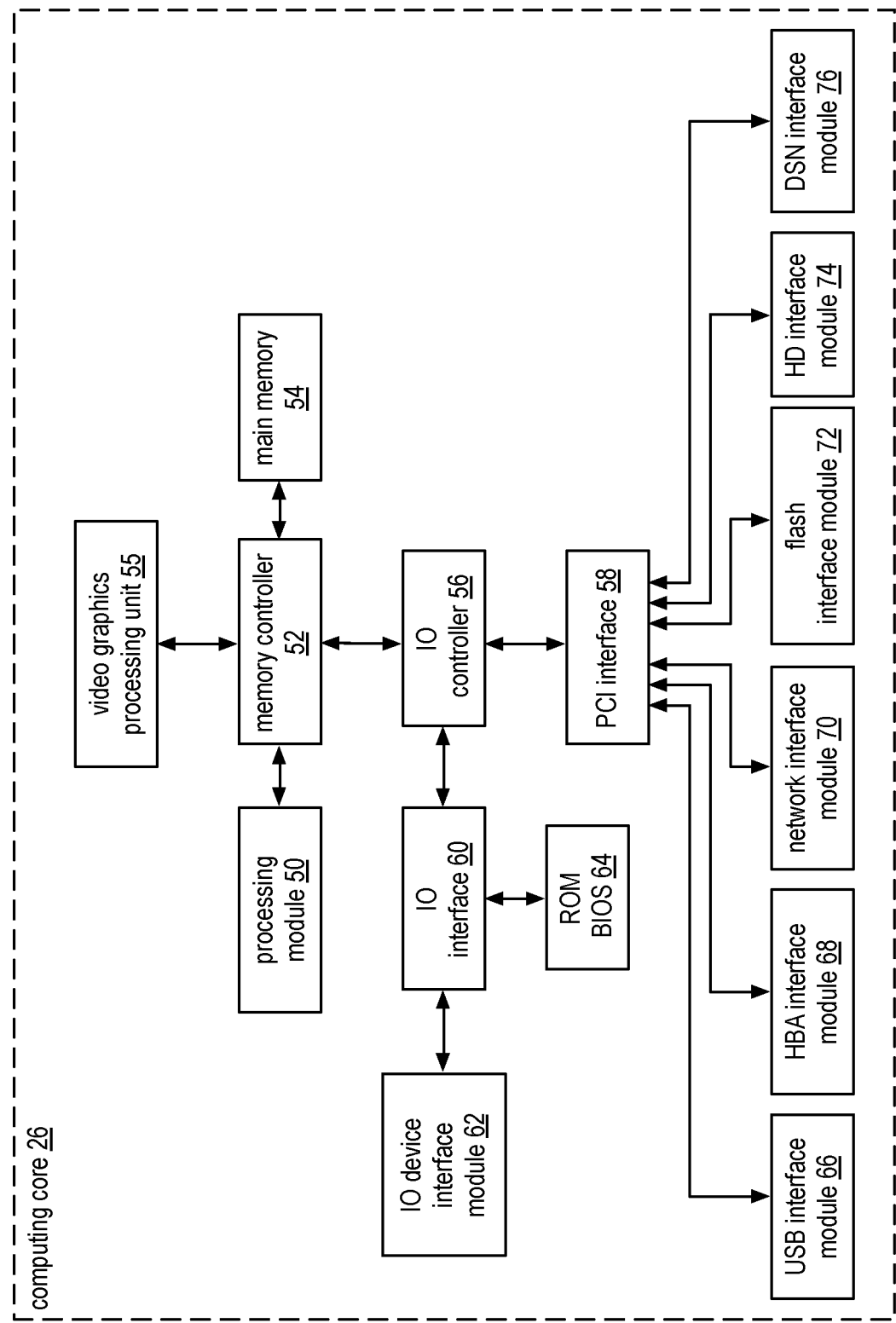
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
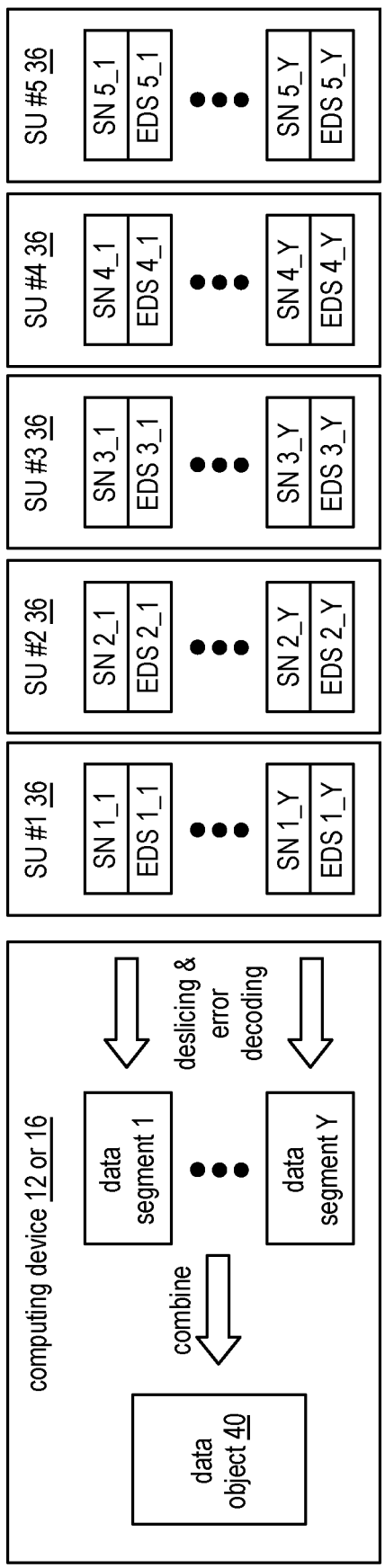
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
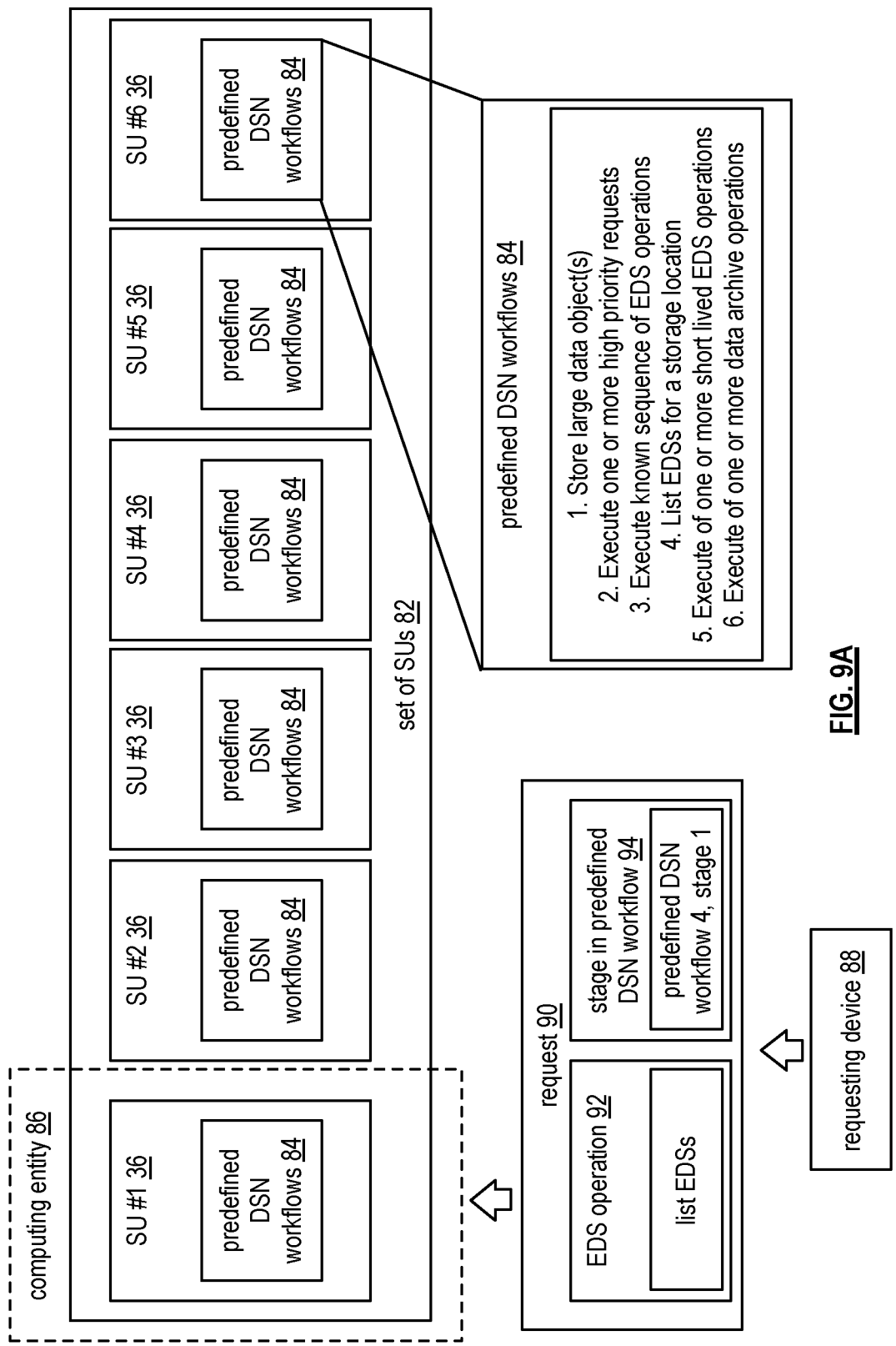
FIGS. 9A-9C are schematic block diagrams of embodiments of the dispersed or distributed storage network (DSN) in accordance with the present invention.
Figure 9B:
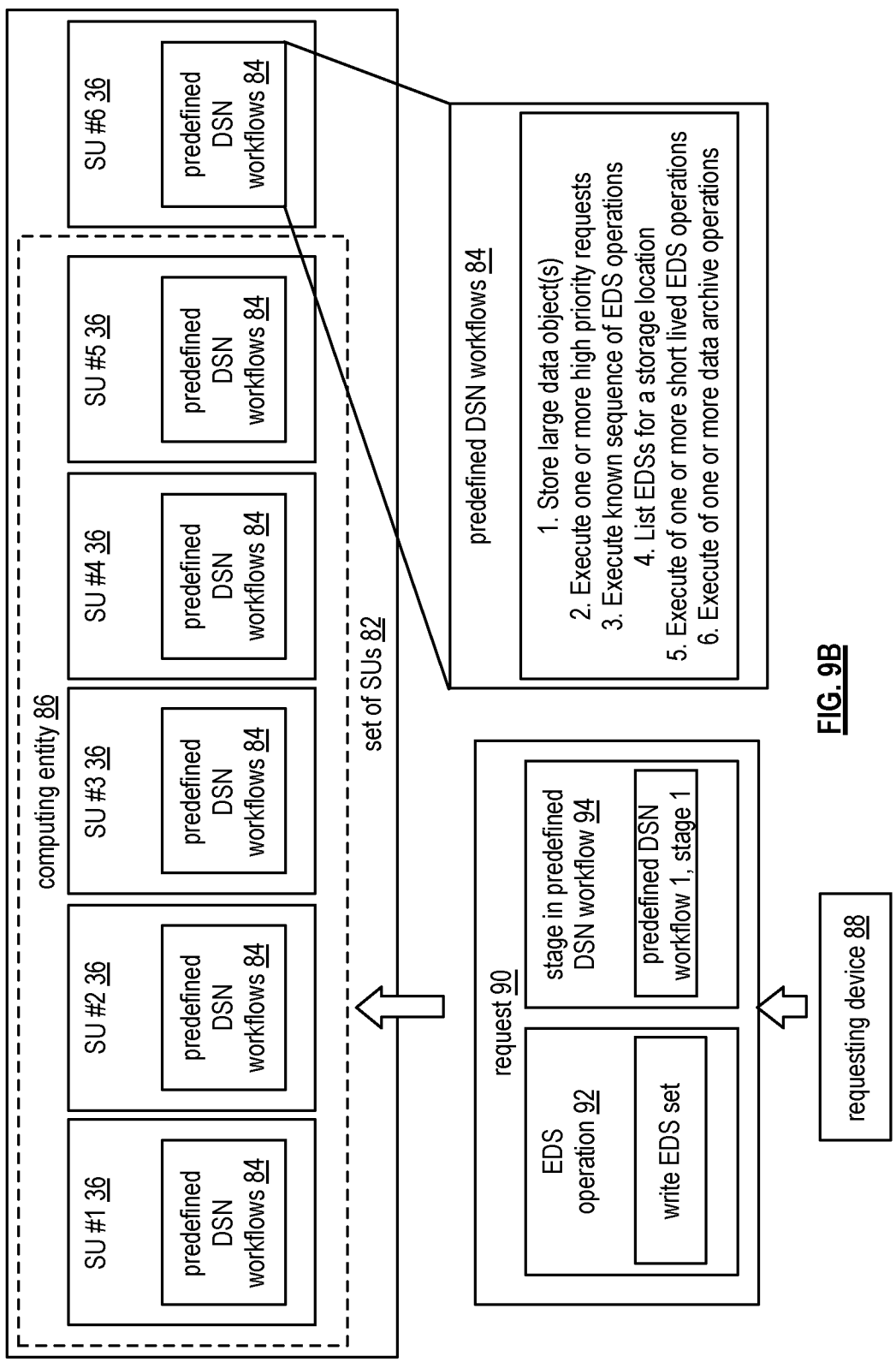
Figure 9C:
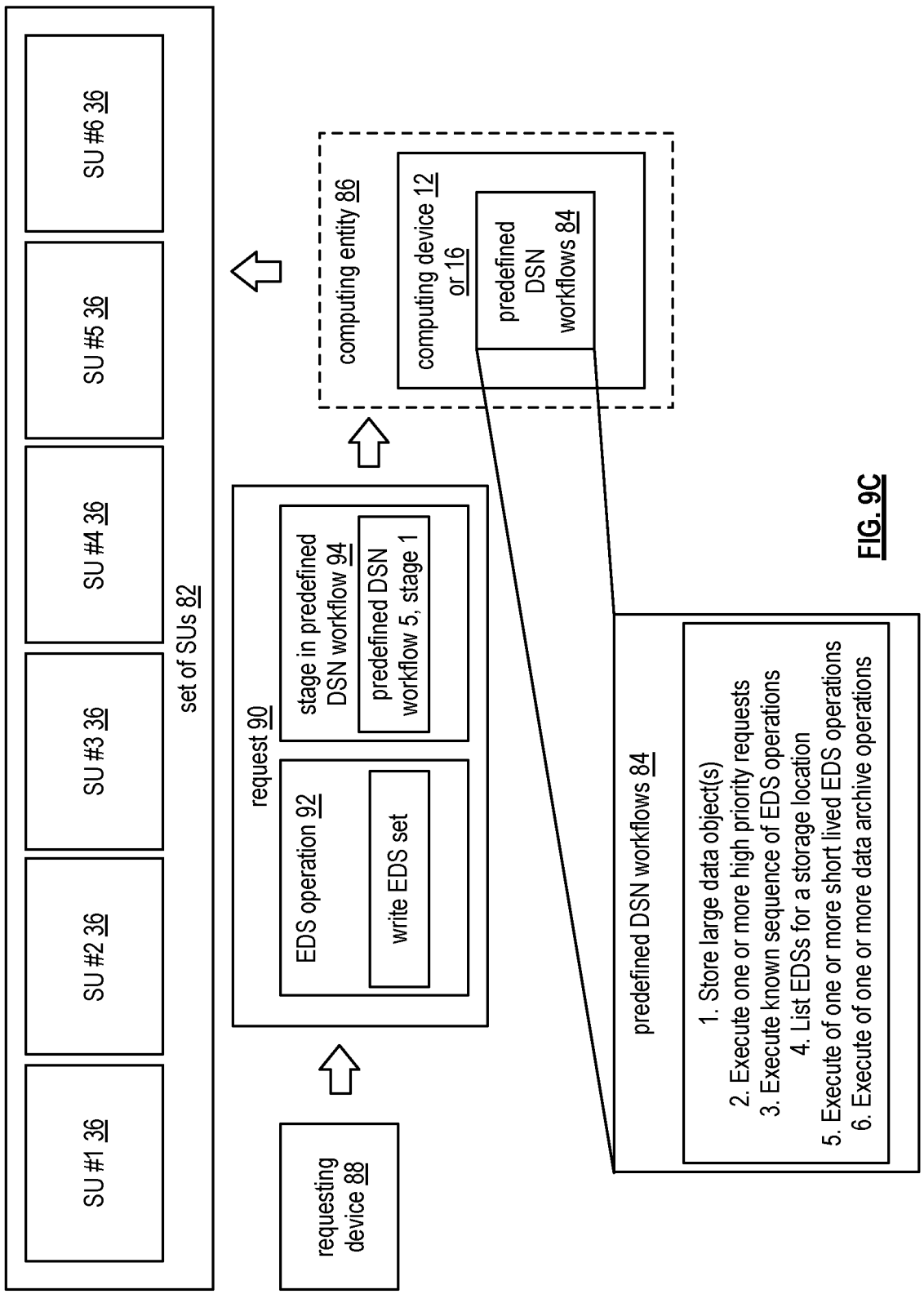

FIGS. 9A-9C are schematic block diagrams of embodiments of the dispersed or distributed storage network (DSN) that include computing entity 86, a set of storage units (SUs) 82, and requesting device 88. Computing entity 86 may be one or more of: a storage unit of the set of storage units 82, at least a decode threshold number of storage units of the set of storage units 82, and computing device 12 or 16. Computing entity 86 is operable to identify and process requests that are part of predefined DSN workflows 84. Predefined DSN workflows 84 include a sequence of two or more encoded data slice operations (e.g., read, write, delete, list, move, etc.). Identifying a request as one or more steps/stages in a predefined DSN workflow allows the computing entity 86 to optimize overall DSN performance.

In FIG. 9A, computing entity 86 is SU #1 36 of the set of SUs 82. Computing entity 86 stores a list of predefined DSN workflows 84 in local memory and/or accesses a list of predefined DSN workflows 84 from another device of the DSN (e.g., computing device 12 or 16, another storage unit of the set of storage units 82, etc.). Predefined DSN workflows 84 include: 1) storage of one or more large data objects, 2) execution of one or more high priority requests, 3) execution of a known sequence of encoded data slice operations, 4) listing encoded data slices for a particular storage location, 5) execution of one or more short lived encoded data slice operations, and 6) execution of one or more data archive operations.

Examples of known sequences of encoded data slice operations include a metadata retrieval request (e.g., a HEAD request in Hypertext Transfer Protocol (HTTP)) followed by a read request (e.g., a GET request in HTTP), read requests in a particular sequence (e.g., GETs using sequential ranged reads), a metadata retrieval request followed by a sequence of read requests (e.g., a multipart download is being performed), a metadata retrieval request followed by a delete request, a metadata retrieval request followed by a request to extend retention time for a resource, and a write request (e.g., a PUT request in HTTP) followed by a delete. A write request shortly followed by a delete request is a known sequence but is also a short lived encoded data slice operation.

An example of listing encoded data slices for a particular storage location includes a request to sequentially list all data objects in a bucket (e.g., a portion of a logical storage vault associated with one or more DSN users) or other storage location (e.g., sequentially list all encoded data slices in one or more storage units, etc.).

An example of a data archive operation includes a "cloud DVR" operation where a data object that was once stored as multiple copies using fanout is archived after a certain time. The archival process involves reducing the multiple copies to a single copy and storing the single copy to an archival vault. Moving the multi-copy object to a single copy in the archive vault is a multi-stop operation, involving multiple metadata reads, a copy of the object into the archive, then deleting the multiple copies of the original object.

In an example of operation, computing entity 86 receives a request 90 from requesting device 88 of the DSN. For example, requesting device 88 is a user computing device of the DSN. Request 90 identifies an encoded data slice (EDS) operation 92 and an indication that the EDS operation is a stage in a predefined DSN workflow 94. In the example of FIG. 9A, computing entity 86 is SU #1 and EDS operation 92 is at an EDS level (e.g., the request pertains to particular EDS(s) stored or to be stored on SU #1). For example, the EDS operation 92 is a list slice request and the request 90 indicates that the EDS operation 92 is stage 1 in predefined DSN workflow 4 (e.g., list EDSs for a storage location).

In FIG. 9B, computing entity 86 is SUs #1-#5 36 of the set of SUs 82 where a decode threshold number of storage units is three in this example. The EDS operation 92 is at an EDS set level (e.g., the request pertains to a set of EDSs stored or to be stored on SUs #1-#5). For example, the EDS operation 92 is a write EDS set request and the request 90 indicates that the EDS operation 92 is a first stage in predefined DSN workflow 1 (e.g., storage of one or more large data objects).

In FIG. 9C, computing entity 86 is computing device 12 or 16. The EDS operation 92 is at any level (e.g., EDS slice, EDS set, multiple EDS sets, data object, etc.) because computing entity 86 processes requests for the set of SUs 82 and potentially one or more other sets of storage units of the DSN. As shown, computing entity 86 receives request 90 from requesting device 88. EDS operation 92 is a write request for a set of EDSs and the request 90 indicates that the EDS operation 92 is stage 1 in predefined DSN workflow 5 (e.g., a short lived EDS operation).

Figure 10A:
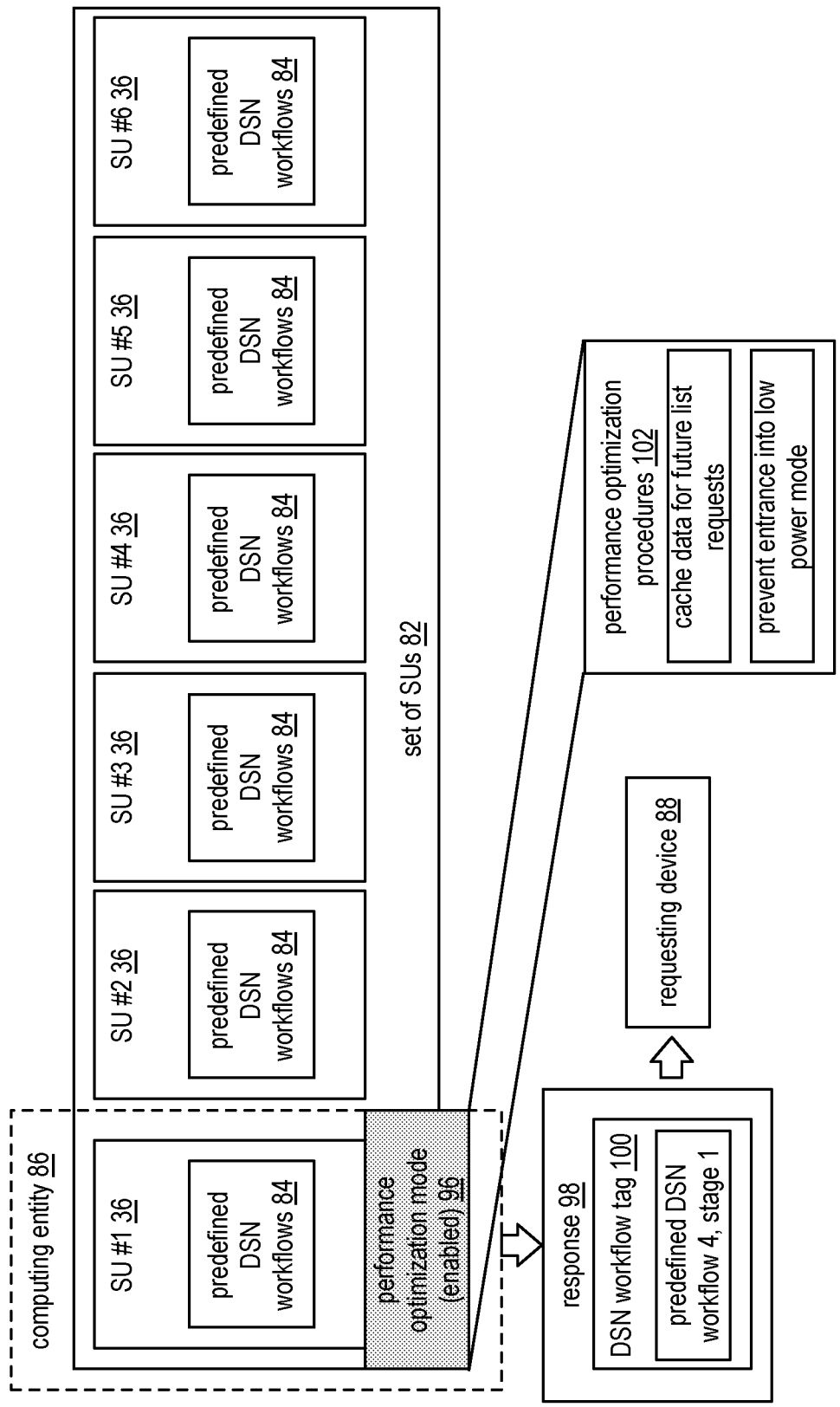
FIGS. 10A-10C are schematic block diagrams of embodiments of the dispersed or distributed storage network (DSN) in accordance with the present invention.
Figure 10B:
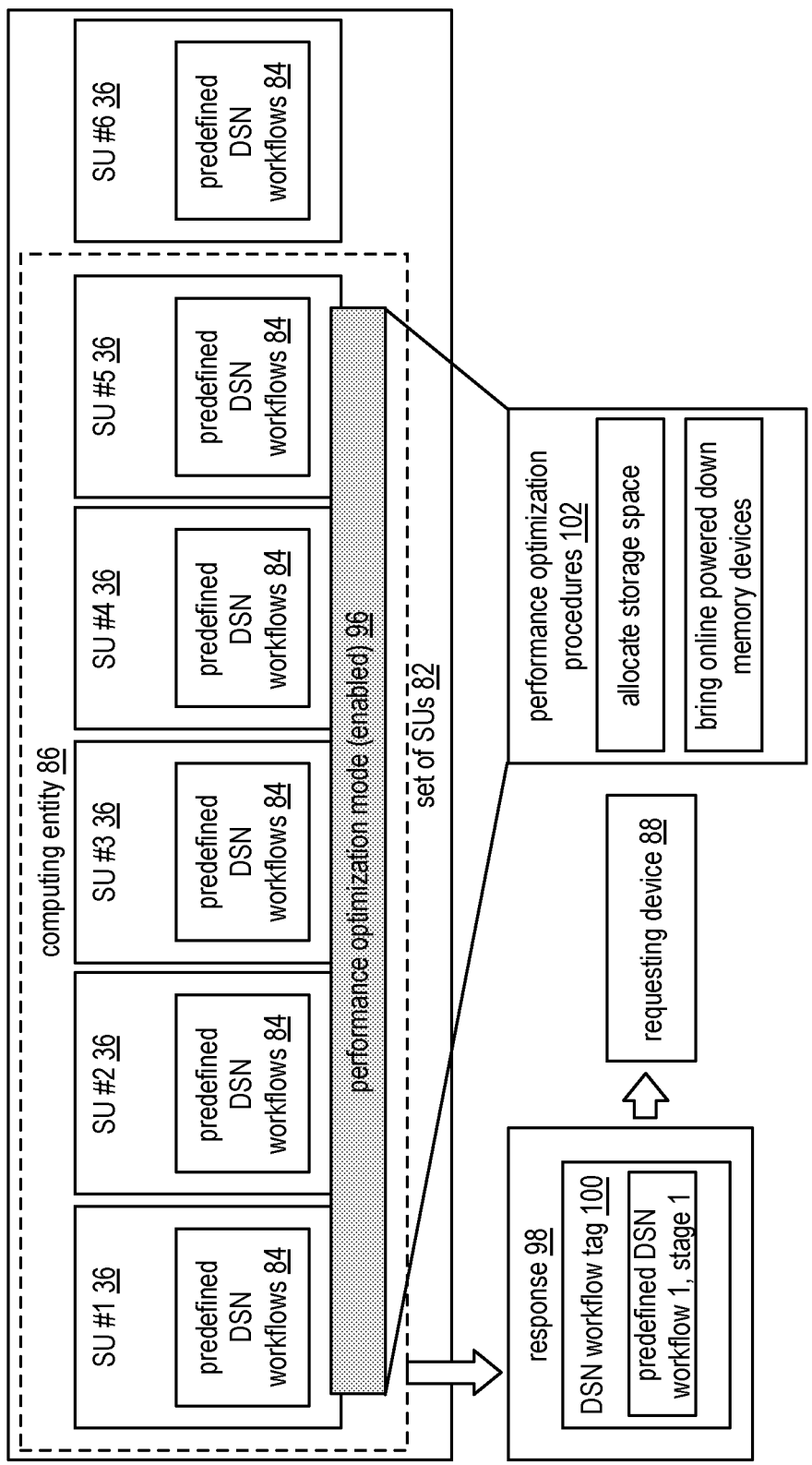
Figure 10C:
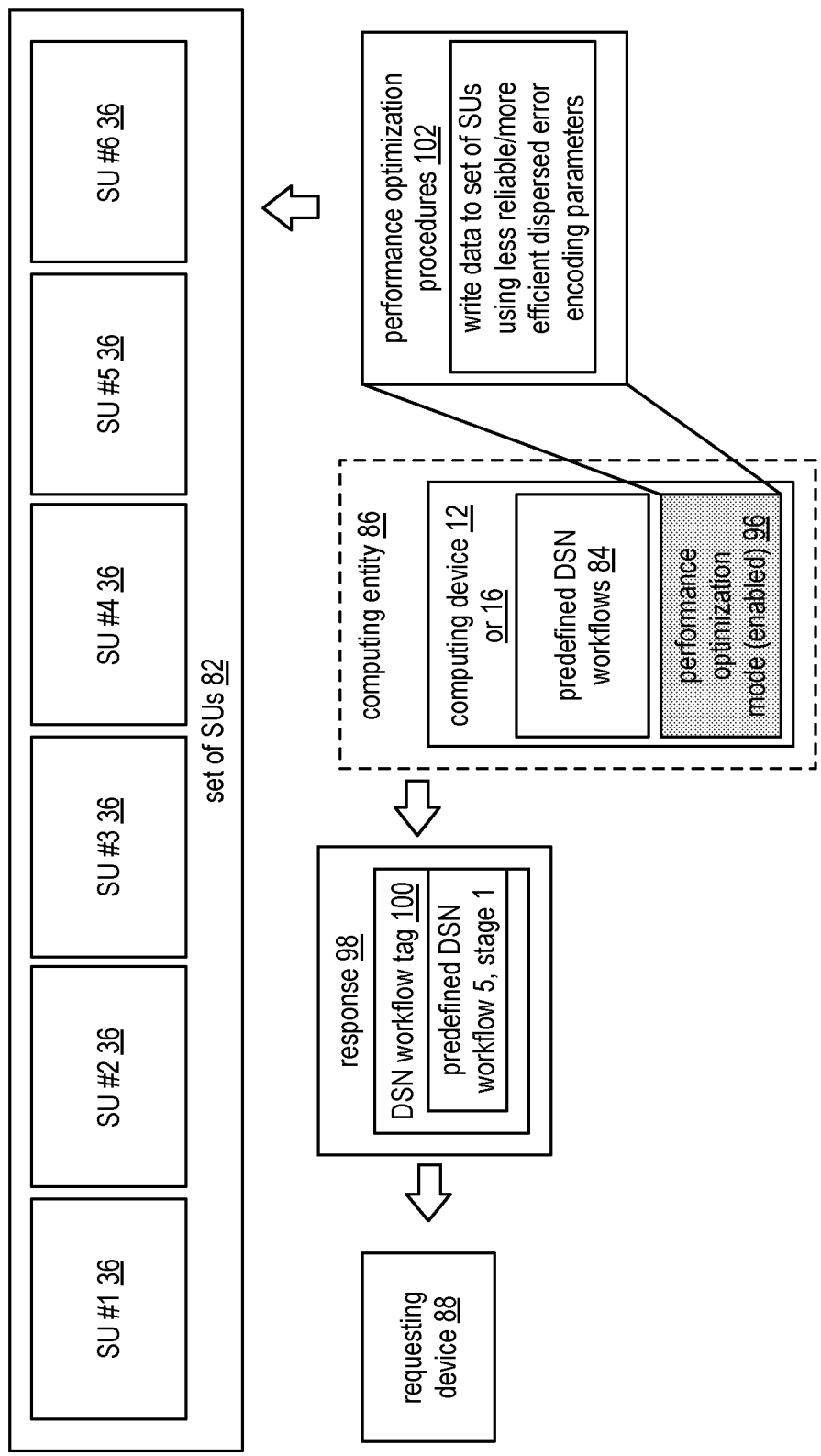

FIGS. 10A-10C are schematic block diagrams of embodiments of the dispersed or distributed storage network (DSN) that includes computing entity 86, set of storage units (SUs) 82, and requesting device 88 and continue the examples of FIGS. 9A-9C.

FIG. 10A continues the example of FIG. 9A where computing entity 86 is SU #1. As discussed above, computing entity 86 received a request 90 that includes a list slice request and an indication that the EDS operation 92 is stage 1 in predefined DSN workflow 4 (e.g., list EDSs for a storage location).

Computing entity 86 sends a response 98 that includes a DSN workflow tag 100 to the requesting device 88. The DSN workflow tag 100 includes an identifier of the stage in the predefined DSN workflow that was indicated in the request 90. For example, DSN workflow tag 100 includes an indication that the request included an EDS operation 92 that is stage 1 in predefined DSN workflow 4.

Computing entity 86 enables performance optimization mode 96. Performance optimization mode 96 includes one or more performance optimization procedures 102 for one or more of: the stage in the predefined DSN workflow and one or more future stages of the predefined DSN workflow. The one or more performance optimization procedures include one or more of: allocating memory of the DSN to execute one or more stages of the predefined DSN workflow, entering a higher power mode to execute the one or more stages of the predefined DSN workflow, allocating cache memory for execution of the one or more stages of the predefined DSN workflow, writing data for execution of the one or more stages of the predefined DSN workflow to the cache memory, assigning one or more processing modules for execution of the one or more stages of the predefined DSN workflow, preventing entrance into a low power mode between stages of the predefined DSN workflow, adjusting a dispersed storage error encoding function based on the one or more stages of the predefined DSN workflow, bringing powered down devices (e.g., memory devices, storage units, etc.) of the DSN online for execution of the one or more stages of the predefined DSN workflow, selecting one or more high performance devices (e.g., memory devices, storage units, etc.) for execution of the one or more stages of the predefined DSN workflow, and suspending one or more lower priority requests during execution of the one or more stages of the predefined DSN workflow.

In this example, predefined DSN workflow 4 is a sequential list slice request for SU#1 where a first stage includes a first list slice request and future stages include next list slice requests in sequential order. To prepare for the next list slice requests, performance optimization procedures 102 include caching the data needed for future list slice requests (e.g., the EDSs in sequential order) and preventing entrance into a low power mode until the workflow is completed.

Computing entity 86 may wait a certain period of time to receive a second request from the requesting device indicating the next stage in the predefined DSN workflow. If the second request is not received within the certain period of time, the computing entity disables the performance optimization mode 96. For example, if another list slice request is not received within the certain period of time, SU #1 removes the data from cache memory and may return to a low power mode if desired.

Alternatively, the requesting device 88 may choose to abandon the predefined DSN workflow by expressly indicating so in a next request or by sending a request that does not include an indication of the expected next stage in the predefined DSN workflow. In either case, the computing entity would disable the performance optimization mode 96 and return to processing requests normally.

When a next request including an indication of the next step is received by the computing entity 86, computing entity 86 determines whether to adjust the performance optimization mode 96. Adjusting the performance optimization mode includes adjusting the one or more performance optimization procedures for one or more of: the next stage and the one or more future stages in the predefined DSN workflow. For example, a next request is received indicating the next sequential list slice request. In this case, the data is already in cache memory and prevention of entering the low power mode is continued. Thus, there is no need to adjust the adjust the performance optimization mode 96. As an alternative example, if cache memory was too full initially to store all the data required for future stages but is now available, adjusting the one or more performance optimization procedures may include storing the remaining data needed in cache memory.

FIG. 10B continues the example of FIG. 9B where computing entity 86 is SUs #1-#5. As discussed above, computing entity 86 received a request 90 that includes the EDS operation 92 write EDS set and an indication that the EDS operation 92 is stage 1 in predefined DSN workflow 1 (e.g., store large data object).

Computing entity 86 sends a response 98 that includes a DSN workflow tag 100 to the requesting device 88. The DSN workflow tag 100 includes an identifier of the stage in the predefined DSN workflow that was indicated in the request 90. For example, DSN workflow tag 100 includes an indication that the request included an EDS operation 92 that is stage 1 in predefined DSN workflow 1 (e.g., store large data object).

Computing entity 86 enables performance optimization mode 96. Performance optimization mode 96 includes one or more performance optimization procedures 102 for one or more of: the stage in the predefined DSN workflow and one or more future stages of the predefined DSN workflow. In this example, predefined DSN workflow 1 is storage of a large data object where a first stage includes a write of a first set of encoded data slices of the large object and future stages include write requests for remaining sets of encoded data slices of the large data object. To prepare for the next write requests, performance optimization procedures 102 include allocating the required storage space and bringing online any powered down memory devices. For example, SU #5 may have a powered down memory device that is brought online in preparation of several write requests.

As discussed above, computing entity 86 may wait a certain period of time to receive a second request from the requesting device indicating the next stage in the predefined DSN workflow. If the second request is not received within the certain period of time, the computing entity 86 disables the performance optimization mode. For example, if another write request for a set of encoded data slices of the large data object is not received within the certain period of time, SUs #5 powers down its previously powered down memory device and SUs #1-#5 deallocate storage space.

The requesting device 88 may choose to abandon the predefined DSN workflow by expressly indicating so in a request or by sending a request that does not include an indication of a next stage in the predefined DSN workflow. In either case, the computing entity disables the performance optimization mode 96.

When a next request including an indication of the next step is received by the computing entity 86, computing entity 86 determines whether to adjust the performance optimization mode 96. Adjusting the performance optimization mode includes adjusting the one or more performance optimization procedures for one or more of: the next stage and the one or more future stages in the predefined DSN workflow. For example, a next request is received indicating a next write request for a set of encoded data slices of the large data object. At this time, the computing entity 86 may determine that further storage space is needed and thus adjusts the performance optimization procedures 102 to allocate further storage space.

FIG. 10C continues the example of FIG. 9C where computing entity 86 is computing device 12 or 16. As discussed above, computing entity 86 received a request 90 that includes the EDS operation 92 write EDS set and an indication that the EDS operation 92 is stage 1 in predefined DSN workflow 5 (e.g., a short lived EDS operation).

Computing entity 86 sends a response 98 that includes a DSN workflow tag 100 to the requesting device 88. The DSN workflow tag 100 includes an identifier of the stage in the predefined DSN workflow that was indicated in the request 90. For example, DSN workflow tag 100 includes an indication that the request included an EDS operation 92 is stage 1 in predefined DSN workflow 5 (e.g., a short lived EDS operation).

Computing entity 86 enables performance optimization mode 96. Performance optimization mode 96 includes one or more performance optimization procedures 102 for one or more of: the stage in the predefined DSN workflow and one or more future stages of the predefined DSN workflow. In this example, predefined DSN workflow 5 is a short lived EDS operation where a first stage includes a write request for a set of encoded data slices and the next stage includes a delete request for the set of encoded data slices. Because the set of encoded data slices is expected to be deleted shortly, performance optimization procedures 102 include adjusting a dispersed storage error encoding function to include less reliable and more efficient dispersed storage parameters.

For example, a dispersed storage error encoding function includes a pillar width of 6 and a decode threshold of 3. The function is adjusted to reduce reliability and increase efficiency by reducing the pillar width from 6 to 4. Therefore, only 4 encoded data slices are written to 4 storage units of the set of SUs 82.

As discussed above, computing entity 86 may wait a certain period of time to receive a second request from the requesting device indicating the next stage in the predefined DSN workflow. If the second request is not received within the certain period of time, the computing entity 86 disables the performance optimization mode 96. For example, if the delete request for the set of encoded data slices is not received within the certain period of time, computing entity 86 adjusts the pillar width back to 6 and rewrites the encoded data slices for more reliability.

The requesting device 88 may choose to abandon the predefined DSN workflow by expressly indicating so in a request or by sending a request that does not include an indication of a next stage in the predefined DSN workflow. In either case, the computing entity disables the performance optimization mode 96.

When a next request including an indication of the next step is received by the computing entity 86, computing entity 86 determines whether to adjust the performance optimization mode 96. Adjusting the performance optimization mode includes adjusting the one or more performance optimization procedures for one or more of: the next stage and the one or more future stages in the predefined DSN workflow. In this example, the next stage is the delete request. Therefore, the computing entity 86 does not adjust the performance optimization procedures 102 and the delete request is executed if received.

Figure 11:
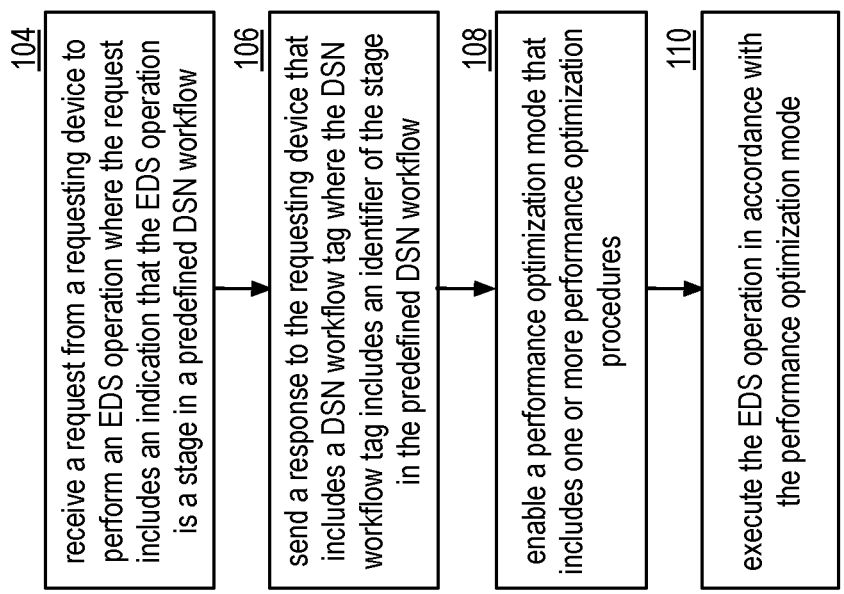
FIG. 11 is a logic diagram of an example of a method of identifying and processing predefined dispersed storage network (DSN) workflows in accordance with the present invention.

FIG. 11 is a logic diagram of an example of a method of identifying and processing predefined dispersed storage network (DSN) workflows. The method begins with step 104 where a computing entity of the DSN receives a request from a requesting device of the DSN to perform an encoded data slice operation. Computing entity may be a storage unit of a set of storage units of the DSN, at least a decode threshold number of storage units of the set of storage units, or a computing device of the DSN (e.g., computing device 12 or 16).

When the computing entity is at least a decode threshold number of storage units of a set, the encoded data slice operation may pertain to a set of encoded data slices stored in or to be stored in the set of storage units such that the decode threshold number of storage units is operable to execute the request. When the computing entity is a storage unit, the encoded data slice operation may pertain to one or more encoded data slices stored in or to be stored in the storage unit such that the storage unit is operable to execute the request. When the computing entity is a computing device such as computing device 12 or 16, the encoded data slice operation may pertain to one or more data objects, one or more data segments, one or more sets of encoded data slices, and/or one or more encoded data slices stored in or to be stored in one or more sets of storage units of the DSN such that the computing device is operable to coordinate execution of the for the one or more sets of storage units.

The request includes an indication that the encoded data slice operation is a stage in a predefined DSN workflow. Predefined DSN workflows include one or more of: storage of one or more large data objects, execution of one or more high priority requests, execution of a known sequence of encoded data slice operations, listing encoded data slices for a particular storage location, execution of one or more short lived encoded data slice operations, and execution of one or more data archive operations.

Examples of known sequences of encoded data slice operations include a metadata retrieval request (e.g., a HEAD request in Hypertext Transfer Protocol (HTTP)) followed by a read request (e.g., a GET request in HTTP), read requests in a particular sequence (e.g., GETs using sequential ranged reads), a metadata retrieval request followed by a sequence of read requests (e.g., a multipart download is being performed), a metadata retrieval request followed by a delete request, a metadata retrieval request followed by a request to extend retention time for a resource, and a write request (e.g., a PUT request in HTTP) followed by a delete. A write request shortly followed by a delete request is a known sequence but is also a short lived encoded data slice operation.

An example of listing encoded data slices for a particular storage location includes a request to sequentially list all data objects in a bucket (e.g., a portion of a logical storage vault associated with one or more DSN users) or other storage location (e.g., sequentially list all encoded data slices in one or more storage units, etc.).

An example of a data archive operation includes a "cloud DVR" operation where a data object that was once stored as multiple copies using fanout is archived after a certain time. The archival process involves reducing the multiple copies to a single copy and storing the single copy to an archival vault. Moving the multi-copy object to a single copy in the archive vault is a multi-stop operation, involving multiple metadata reads, a copy of the object into the archive, then deleting the multiple copies of the original object.

As a specific example, the request may include an encoded data slice operation that is a first metadata read and an indication that this operation is a first stage in a data archive operation.

The method continues with step 106 where the computing entity sends a response to the requesting device that includes a DSN workflow tag. The DSN workflow tag includes an identifier of the stage in the predefined DSN workflow.

The method continues with step 108 where the computing entity enables a performance optimization mode. The performance optimization mode includes one or more performance optimization procedures for one or more of: the stage and one or more future stages of the predefined DSN workflow.

The one or more performance optimization procedures include one or more of: allocating memory of the DSN to execute one or more stages of the predefined DSN workflow, entering a higher power mode to execute the one or more stages of the predefined DSN workflow, allocating cache memory for execution of the one or more stages of the predefined DSN workflow, writing data for execution of the one or more stages of the predefined DSN workflow to the cache memory, assigning one or more processing modules for execution of the one or more stages of the predefined DSN workflow, preventing entrance into a low power mode between stages of the predefined DSN workflow, adjusting a dispersed storage error encoding function based on the one or more stages of the predefined DSN workflow, bringing powered down devices (e.g., memory devices, storage units, etc.) of the DSN online for execution of the one or more stages of the predefined DSN workflow, selecting one or more high performance devices (e.g., memory devices, storage units, etc.) for execution of the one or more stages of the predefined DSN workflow, and suspending one or more lower priority requests during execution of the one or more stages of the predefined DSN workflow.

As a specific example, for one or more stages of storing one or more large data objects, the performance optimization procedures may include allocating memory to ensure that all objects can be written and bringing online powered down memory devices.

As another example, for the first stage of execution of one or more high priority requests, the performance optimization procedures may include temporarily suspending low priority processes (e.g., scanning, rebuilding, etc.) for the duration of the workflow. Further, high performance (e.g., faster) memory devices can be selected to complete the workflow faster.

As another example, for one or more stages of execution of a known sequence of encoded data slice operations, the performance optimization procedures may include caching data and/or metadata required or likely needed for the next step. The ability to know that data should be cached locally is especially useful in a geo-dispersed environment, where there may be significant latency between various remote sites As another example, for one or more stages of listing encoded data slices for a particular storage location, the performance optimization procedures may include caching the data needed to satisfy future list requests.

As another example, for one or more stages of execution of one or more short lived encoded data slice operations, the performance optimization procedures may include writing the data with less reliable but efficient dispersed error encoding function parameters.

As another example, for execution of one or more data archive operations, the performance optimization procedures may include caching metadata needed for each step of the archive operation.

The method continues with step 108 where the computing entity executes the encoded data slice operation in accordance with the performance optimization mode. For example, for the first stage of the short lived data operation, the data is written in accordance with the adjusted dispersed error encoding function parameters. The computing entity may then receive a second request from the requesting device to perform a second encoded data slice operation, where the second request includes a second indication that the second encoded data slice operation is a next stage in the predefined DSN workflow. In that case, the computing entity sends a second DSN workflow tag to the requesting device, where the second DSN workflow tag includes a second identifier of the next stage in the predefined DSN workflow.

The computing entity determines whether to adjust the performance optimization mode based on the at least one of the second encoded data slice operation and the predefined DSN workflow. The adjusting the performance optimization mode includes adjusting the one or more performance optimization procedures for one or more of: the next stage and the one or more future stages in the predefined DSN workflow. For example, the computing entity may determine to allocate more storage space than initially determined to complete the steps of the workflow.

As another example, for any predefined DSN workflow, the performance optimization procedures may be adjusted to cache data for the next stage of the workflow if all data is not cached initially. The computing entity executes the second encoded data slice operation in accordance with the adjusted performance optimization mode.

Alternatively, the computing entity may receive a second request from the requesting device to perform a second encoded data slice operation, where the second request does not include a second indication that the second encoded data slice operation is a next stage in the predefined DSN workflow or that the requesting device wishes to abandon the predefined DSN workflow. In either case, the computing entity disables the performance optimization mode and executes the second encoded data slice operation normally.

As another example, the computing entity may wait a certain period of time to receive a second request from the requesting device to perform a second encoded data slice operation where the second request includes a second indication that the second encoded data slice operation is a next stage in the predefined DSN workflow. When the second request is not received within the certain period of time, the computing entity disables the performance optimization mode.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
receiving, by a computing entity of a dispersed storage network (DSN), a request from a requesting device of the DSN to perform an encoded data slice operation, wherein the request includes an indication that the encoded data slice operation is a stage in a predefined DSN workflow;
sending, by the computing entity, a response to the requesting device that includes a DSN workflow tag, wherein the DSN workflow tag includes an identifier of the stage in the predefined DSN workflow;
enabling, by the computing entity, a performance optimization mode, wherein the performance optimization mode includes one or more performance optimization procedures for one or more of: the stage and one or more future stages of the predefined DSN workflow; and
executing, by the computing entity, the encoded data slice operation in accordance with the performance optimization mode.

2. The method of claim 1 further comprises:
receiving, by the computing entity, a second request from the requesting device to perform a second encoded data slice operation, wherein the second request includes a second indication that the second encoded data slice operation is a next stage in the predefined DSN workflow;
sending, by the computing entity, a second DSN workflow tag to the requesting device, wherein the second DSN workflow tag includes a second identifier of the next stage in the predefined DSN workflow;
determining, by the computing entity, whether to adjust the performance optimization mode based on the at least one of the second encoded data slice operation and the predefined DSN workflow,
wherein the adjusting the performance optimization mode includes adjusting the one or more performance optimization procedures for one or more of: the next stage and the one or more future stages in the predefined DSN workflow; and
when the computing entity determines to adjust the performance optimization mode:
executing, by the computing entity, the second encoded data slice operation in accordance with the adjusted performance optimization mode; and
when the computing entity does not determine to adjust the performance optimization mode:
executing, by the computing entity, the second encoded data slice operation in accordance with the performance optimization mode.

3. The method of claim 1 further comprises:
receiving, by the computing entity, a second request from the requesting device to perform a second encoded data slice operation, wherein the second request does not include a second indication that the second encoded data slice operation is a next stage in the predefined DSN workflow;
disabling, by the computing entity, the performance optimization mode; and
executing, by the computing entity, the second encoded data slice operation.

4. The method of claim 1 further comprises:
waiting, by the computing entity, a certain period of time to receive a second request to perform a second encoded data slice operation from the requesting device, wherein the second request includes a second indication that the second encoded data slice operation is a next stage in the predefined DSN workflow; and
when the second request is not received within the certain period of time:
disabling, by the computing entity, the performance optimization mode.

5. The method of claim 1 further comprises:
receiving, by the computing entity, a second request from the requesting device to perform a second encoded data slice operation, wherein the second request includes a request to abandon the predefined DSN workflow;
disabling, by the computing entity, the performance optimization mode; and
executing, by the computing entity, the second encoded data slice operation.

6. The method of claim 1, wherein the predefined DSN workflow includes one or more of:
storage of one or more large data objects;
execution of one or more high priority requests;
execution of a known sequence of encoded data slice operations;
listing encoded data slices for a particular storage location;
execution of one or more short lived encoded data slice operations; and
execution of one or more data archive operations.

7. The method of claim 1, wherein the one or more performance optimization procedures include one or more of:
allocating, by the computing entity, memory of the DSN to execute one or more stages of the predefined DSN workflow;
entering, by the computing entity, a higher power mode to execute the one or more stages of the predefined DSN workflow;
allocating, by the computing entity, cache memory for execution of the one or more stages of the predefined DSN workflow;
writing, by the computing entity, data for execution of the one or more stages of the predefined DSN workflow to the cache memory;
assigning, by the computing entity, one or more processing modules for execution of the one or more stages of the predefined DSN workflow;
preventing, by the computing entity, entrance into a low power mode between stages of the predefined DSN workflow;
adjusting, by the computing entity, a dispersed storage error encoding function based on the one or more stages of the predefined DSN workflow;
bringing, by the computing entity, powered down devices of the DSN online for execution of the one or more stages of the predefined DSN workflow;
selecting, by the computing entity, one or more high performance devices for execution of the one or more stages of the predefined DSN workflow; and
suspending, by the computing entity, one or more lower priority requests during execution of the one or more stages of the predefined DSN workflow.

8. The method of claim 1, wherein the encoded data slice operation pertains to a set of encoded data slices and the computing entity includes at least a decode threshold number of storage units of a set of storage units of the DSN.

9. The method of claim 1, wherein the encoded data slice operation pertains to one or more encoded data slices and the computing entity includes a storage unit of a set of storage units of the DSN.

10. The method of claim 1, wherein the encoded data slice operation pertains to one or more of: one or more data objects, one or more data segments, one or more sets of encoded data slices, and one or more encoded data slices and the computing entity includes a computing device of the DSN.

11. A computing entity of a dispersed storage network (DSN), the computing entity comprises:
an interface;
memory; and
a processing module operably coupled to the memory and the interface, wherein the processing module is operable to:
receive a request from a requesting device of the DSN to perform an encoded data slice operation, wherein the request includes an indication that the encoded data slice operation is a stage in a predefined DSN workflow;
send a response to the requesting device that includes a DSN workflow tag, wherein the DSN workflow tag includes an identifier of the stage in the predefined DSN workflow;
enable a performance optimization mode, wherein the performance optimization mode includes one or more performance optimization procedures for one or more of: the stage and one or more future stages of the predefined DSN workflow; and
execute the encoded data slice operation in accordance with the performance optimization mode.

12. The computing entity of claim 11, wherein the processing module is further operable to:
receive a second request from the requesting device to perform a second encoded data slice operation, wherein the second request includes a second indication that the second encoded data slice operation is a next stage in the predefined DSN workflow;
send a second DSN workflow tag to the requesting device, wherein the second DSN workflow tag includes a second identifier of the next stage in the predefined DSN workflow;
determine whether to adjust the performance optimization mode based on the at least one of the second encoded data slice operation and the predefined DSN workflow, wherein the adjusting the performance optimization mode includes adjusting the one or more performance optimization procedures for one or more of: the next stage and the one or more future stages in the predefined DSN workflow; and
when the processing module determines to adjust the performance optimization mode:
executing the second encoded data slice operation in accordance with the adjusted performance optimization mode; and
when the processing does not determine to adjust the performance optimization mode:
executing the second encoded data slice operation in accordance with the performance optimization mode.

13. The computing entity of claim 11, wherein the processing module is further operable to:
receive a second request from the requesting device to perform a second encoded data slice operation, wherein the second request does not include a second indication that the second encoded data slice operation is a next stage in the predefined DSN workflow;
disable the performance optimization mode; and
execute the second encoded data slice operation.

14. The computing entity of claim 11, wherein the processing module is further operable to:
wait a certain period of time to receive a second request to perform a second encoded data slice operation from the requesting device, wherein the second request includes a second indication that the second encoded data slice operation is a next stage in the predefined DSN workflow; and
when the second request is not received within the certain period of time:
disable the performance optimization mode.

15. The computing entity of claim 11, wherein the processing module is further operable to:
receive a second request from the requesting device to perform a second encoded data slice operation, wherein the second request includes a request to abandon the predefined DSN workflow;
disable the performance optimization mode; and
execute the second encoded data slice operation.

16. The computing entity of claim 11, wherein the predefined DSN workflow includes one or more of:
storage of one or more large data objects;
execution of one or more high priority requests;
execution of a known sequence of encoded data slice operations;
listing encoded data slices for a particular storage location;
execution of one or more short lived encoded data slice operations; and
execution of one or more data archive operations.

17. The computing entity of claim 11, wherein the one or more performance optimization procedures include one or more of:
allocating memory of the DSN to execute one or more stages of the predefined DSN workflow;
entering a higher power mode to execute the one or more stages of the predefined DSN workflow;
allocating cache memory for execution of the one or more stages of the predefined DSN workflow;
writing data for execution of the one or more stages of the predefined DSN workflow to the cache memory;
assigning one or more processing modules for execution of the one or more stages of the predefined DSN workflow;
preventing entrance into a low power mode between stages of the predefined DSN workflow;
adjusting a dispersed storage error encoding function based on the one or more stages of the predefined DSN workflow;
bringing powered down devices of the DSN online for execution of the one or more stages of the predefined DSN workflow;
selecting one or more high performance devices for execution of the one or more stages of the predefined DSN workflow; and
suspending one or more lower priority requests during execution of the one or more stages of the predefined DSN workflow.

18. The computing entity of claim 11, wherein the encoded data slice operation pertains to a set of encoded data slices and the computing entity includes at least a decode threshold number of storage units of a set of storage units of the DSN.

19. The computing entity of claim 11, wherein the encoded data slice operation pertains to one or more encoded data slices and the computing entity includes a storage unit of a set of storage units of the DSN.

20. The computing entity of claim 11, wherein the encoded data slice operation pertains to one or more of: one or more data objects, one or more data segments, one or more sets of encoded data slices, and one or more encoded data slices and the computing entity includes a computing device of the DSN.

* * * * *